US011262320B2

(12) United States Patent
Kumar et al.

(10) Patent No.: US 11,262,320 B2
(45) Date of Patent: Mar. 1, 2022

(54) MONITOR FOR MEASURING MERCURY EMISSIONS

(71) Applicant: UHV Technologies, Inc., Fort Worth, TX (US)

(72) Inventors: Nalin Kumar, Fort Worth, TX (US); Manuel Gerardo Garcia, Jr., Lexington, KY (US)

(73) Assignee: UHV Technologies, Inc., Fort Worth, TX (US)

( * ) Notice: Subject to any disclaimer, the term of this patent is extended or adjusted under 35 U.S.C. 154(b) by 1158 days.

(21) Appl. No.: 15/227,730

(22) Filed: Aug. 3, 2016

(65) Prior Publication Data

US 2017/0038320 A1    Feb. 9, 2017

Related U.S. Application Data

(60) Provisional application No. 62/200,448, filed on Aug. 3, 2015.

(51) Int. Cl.
*G01N 23/223*   (2006.01)
*G01N 23/2204*   (2018.01)
*G01N 23/2202*   (2018.01)

(52) U.S. Cl.
CPC ....... *G01N 23/223* (2013.01); *G01N 23/2204* (2013.01); *G01N 23/2202* (2013.01)

(58) Field of Classification Search
CPC ............. G01N 23/223; G01N 33/0045; G01N 2223/652; G01N 2223/076; G01N 23/2204; G01N 23/2202
See application file for complete search history.

(56) References Cited

U.S. PATENT DOCUMENTS 3,940,614 A †  2/1976  Rhodes
5,492,627 A    2/1996  Hagen et al.
(Continued)

OTHER PUBLICATIONS

"Continuous Determination of Mercury in Air by Gold Amalgamation and Flameless Atomic Absorption", the Rigaku Journal, 1990 to Tanida et al.*

(Continued)

*Primary Examiner* — Kenneth J Malkowski
(74) *Attorney, Agent, or Firm* — Kelly Kordzik; Jerry Keys; Matheson Keys & Kordzik PLLC

(57) ABSTRACT

A mercury emissions monitor includes a mercury sensor tape configured to be fed in a reel-to-reel manner between first and second tape reels, wherein the mercury sensor tape includes a thin metallic film configured to form an amalgam with detected mercury. A mercury collection unit is configured to receive into a chamber a sample of a gas containing mercury, wherein the mercury collection unit is further configured to permit passage of portions of the mercury sensor tape through the chamber containing the gas sample so that the amalgam is formed with the thin metallic film. A mercury analysis unit includes a total reflection x-ray fluorescence ("TXRF") system configured to perform a TXRF analysis of the amalgam, wherein the mercury analysis unit is configured to permit passage of the mercury sensor tape within a proximity of an XRF detector of the TXRF system. The mercury collection unit and the mercury analysis unit are positioned between the first and second tape reels so that the mercury sensor tape can move in a continuous manner from the first tape reel through the chamber of the mercury collection unit, then within sufficient proximity to the XRF detector, to be then taken up onto the second tape reel.

22 Claims, 11 Drawing Sheets

(56) References Cited

U.S. PATENT DOCUMENTS

| | | | |
|---|---|---|---|
| 5,596,405 | A | 1/1997 | Seltzer et al. |
| 5,742,658 | A * | 4/1998 | Tiffin .................... G01N 23/20 |
| | | | 257/E21.53 |
| 6,690,462 | B2 | 2/2004 | Seltzer |
| 7,200,200 | B2 | 4/2007 | Laurila et al. |
| 7,539,282 | B2 | 5/2009 | Cooper et al. |
| 7,839,969 | B2 | 11/2010 | Gallup et al. |
| 8,069,703 | B1 | 12/2011 | Granite et al. |
| 8,340,251 | B2 † | 12/2012 | Bertozzi |
| 8,610,019 | B2 | 12/2013 | Roos et al. |
| 9,199,192 | B2 * | 12/2015 | Cooper .................. B01D 53/64 |
| 2003/0118492 | A1 | 6/2003 | Cooper et al. |
| 2010/0050868 | A1 | 3/2010 | Kuznicki et al. |
| 2017/0038320 | A1 † | 2/2017 | Kumar |

OTHER PUBLICATIONS

"Dupont Kapton Polymide Film", p. 1-7 (2012).*
"Overview of X-ray Fluorescence" University of Missouri (2012) to Guthrie.*
"An Evaluation of Remote Sensing Technologies for the Detection of Fugitive Contamination at Selected Superfund Hazardous Waste Sites in Pennsylvania" USGS (2014), pp. 1-23 to Fisher et al.*
"Silver nanoparticle-assisted preconcentration of selenium and mercury on quartz reflectors for total reflection X-ray fluorescence analysis", J. Anal. At. Spectrom., 2014, 29, 696 to Romero et al.*
"Trace element determination of mercury by total-reflection X-ray fluorescence" Spectrochimica Acta Part B 52 (1997) 945-951 to Greaves et al.*
"Handheld XRF Technology Determines Surface Mercury Contamination, Thermo Scientific Niton Handheld XRF Analyzers Enable Rapid, On-Site Elemental Analysis," Application Note, copyright 2014, Thermo Fisher Scientific, Inc., 3 pages.
Buckley et al., "Implementation of laser-induced breakdown spectroscopy as a continuous emissions monitor for toxic metals," Waste Management, vol. 20, 2000, pp. 455-462.
Fonicello, "Unique Problems with the Use of the Handheld XRF Spectrometer for Pesticide Surveys of Ethnographic Collections," ICOM-CC Ethnographic Conservation Newsletter, No. 28, Feb. 2007, pp. 4-8.
López-Antón et al., "Analytical methods for mercury analysis in coal and coal combustion by-products," International Journal of Coal Geology, vol. 94, Jan. 31, 2012, pp. 44-53.
Mercury Information Clearinghouse, Quarterly 2—Mercury Measurement, Apr. 2004, report available to the public from the National Technical Information Service, U.S. Department of Commerce, 5285 Port Royal Road, Springfield, VA 22161, 36 pages.
Seltzer, M. et al., "Inductively Coupled Argon Plasma Continuous Emissions Monitor for Hazardous Air Pollutant Metals," Environ. Sci. Technol., 1997, vol. 31, No. 9, pp. 2666-2672.
Shimadzu, EDX-7000/8000, Energy Dispersive X-Ray Fluorescence Spectrometer, 24 pages; copyright Shimadzu Corporation 2013.
Suwanathada et al., "Quantification of Mercury, Lead, and Cadmium in Aqueous Solutions By Energy K X-Ray Fluorescence Spectroscopy," JCPDS—International Centre for Diffraction Data 2002, Advances in X-ray Analysis, vol. 45, pp. 505-510.
ThermoFisher Scientific, "X-Ray Fluorescence (XRF) Glossary—A Guide to Common Terms," https://www.thermofisher.com/pai, 9 pages; downloaded from www.thermoscientific.com/pai on Jul. 26, 2016.
Zamzow et al., "Real-time atomic absorption mercury continuous emission monitor," Review of Scientific Instruments, vol. 74, No. 8, Aug. 2003, pp. 3774-3783.
International Bureau of WIPO, International Preliminary Report on Patentability, International Application No. PCT/US2016/045405, dated Feb. 15, 2018.
International Searching Authority, International Search Report and Written Opinion, International Application No. PCT/US2016/045405, dated Nov. 7, 2016.
G. Chen et al., "Detection of Mercury (IT) Ions Using Colorimetric Gold Nanoparticles on Paper-Based Analytical Devices," Analytical Chemisty, Jun. 16, 2014, vol. 86, pp. 6843-6849.
Motellier, et al., "Direct Quantification of Airborne Nanoparticles Composition by TXRF After Collection on Filters", Journal of Physics: Conference Series 304 012009, 2011, pp. 1-8.†
"Hope for Environmental Drones Is Still up in the Air", accessed at <<http://www.gibsondunn.com/publications/Documents/Marsh-Environmental-Drones-Law360-03.04.2015.pdf >>, dated Apr. 3, 2015, 4 Pages.†
Tanida, et al., "Continuous Determination of Mercury in Air by Gold Amalgamation and Flameless Atomic Absorption", The Rigaku Journal, 1990, pp. 35-40, vol. 7 No. 2.†
Guthrie, James M., "Overview of X-ray Fluorescence", accessed at <<http://archaeometry.missouri.edu/xrf_overview.html>>, revised Aug. 2012, 8 Pages.†
"Transparent Polyamide Sheet Compared to Polycarbonate Sheet", accessed at <<http://highlinepc.blogspot.com/2012/10/transparent-polyamide-sheet-compared-to.html>>, dated Oct. 21, 2012, 3 Pages.†
"DuPont Kapton Polyamide Film, General Specifications", accessed at <<https://www.kapton-klebeband.de/media/files/DEC-Kapton-general-specs.pdf>>, dated 2012, 7 Pages.†
"Total Reflection X-ray Fluorescence Analysis", accessed at <<http://analyticalprofessional.blogspot.com/2014/04/total-reflection-x-ray-fluorescence.html>>, dated Apr. 28, 2014, 7 Pages.†

\* cited by examiner
† cited by third party

MONITOR FOR MEASURING MERCURY EMISSIONS

This patent application claims priority to U.S. provisional patent application Ser. No. 62/200,448, which is hereby incorporated by reference herein.

GOVERNMENT LICENSE RIGHTS

This invention was made with U.S. government support under Grant No. DE-SC0009651 awarded by the U.S. Department of Energy. The U.S. government may have certain rights in this invention.

TECHNICAL FIELD

The present invention relates in general to monitoring of mercury emissions, and in particular, to the monitoring of mercury emissions utilizing x-ray fluorescence technology.

BACKGROUND INFORMATION

The health hazards of mercury are well known, and mercury emissions from coal-fired electricity generating units ("EGUs") are the biggest polluters of mercury in air. This prompted the U.S. Environmental Protection Agency ("EPA") to strengthen the mercury emissions regulations from EGUs in the U.S. under the Mercury and Air Toxic Standards ("MATS") published in the Federal Register in December 2011. This rule requires existing and new coal-fired power plants to meet stringent mercury reduction levels. Specifically, the rule applies to new and existing EGUs that burn coal or oil for generating greater than 25 megawatts of electricity for sale and distribution through the national electric grid to the public. These new standards limit mercury emissions to the order of tenths to ten-thousandths of a pound/gigawatt-hour (lb/GWh) of gross electrical output depending upon the coal type, whether the plant is existing or new, and the power plant technology. Thus, robust, novel sensor technologies are needed that can accurately, precisely, and continuously monitor and measure mercury emissions levels to determine compliance with these standards and monitoring requirements for coal-fired EGUs.

DETAILED DESCRIPTION

Figure 1:
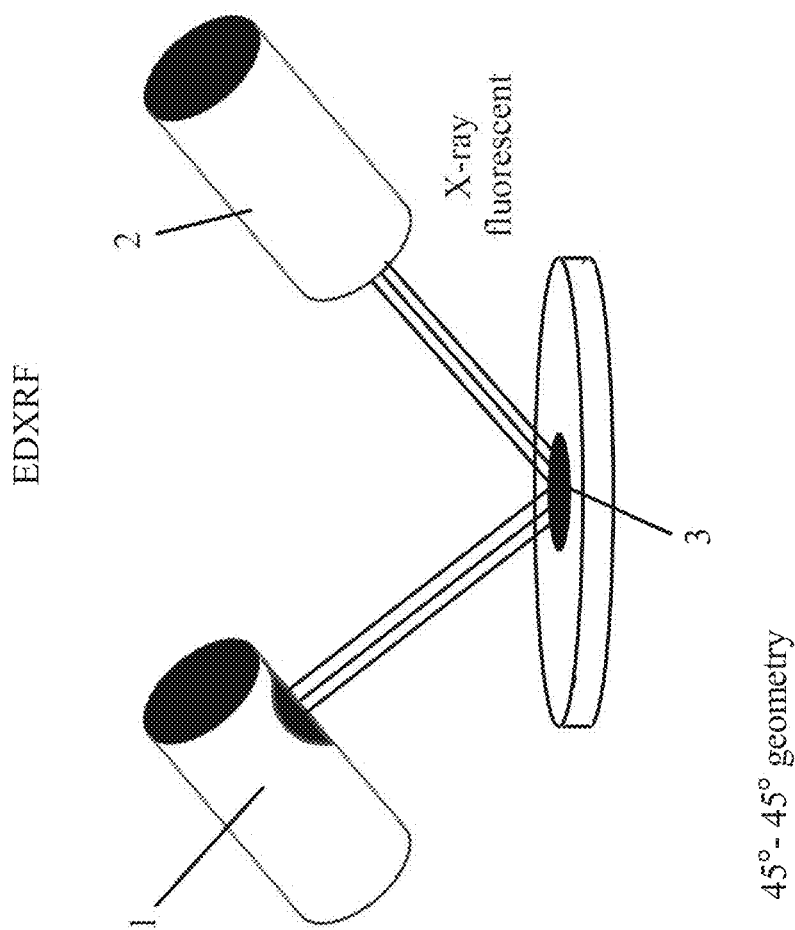
FIG. 1 illustrates an energy dispersive x-ray fluorescence ("ED-XRF") system.

Embodiments of the present invention provide a mercury emissions monitoring system ("EMS") that may be utilized within coal-fired EGUs, coal-fired boilers, the oil and gas industry, steel scrap processing facilities, gold production, waste incineration, and any other application in which levels of mercury need to be monitored (i.e., detected, measured, and/or analyzed). Embodiments of the present invention provide a novel mercury continuous emissions monitor ("CEM") that has advantages over prior art technologies.

Embodiments of the present invention use an advanced x-ray technique (utilizing x-ray fluorescence ("XRF")) to measure the mercury after it has been collected. The mercury is collected in an amalgam, and the primary x-ray beam irradiates the amalgam sample. An amalgam is an alloy of mercury with another metal. Almost all metals can form amalgams with mercury, the notable exceptions being iron, platinum, tungsten, and tantalum.

Since the primary x-ray beam of embodiments of the present invention has a much higher energy than the cold vapor atomic fluorescence ("CVAF") technologies, it can penetrate more easily through matter, meaning that it has the ability to pass through materials with little to no interference that would normally be caused in the CVAF technologies. Such higher x-ray beam energies also mean that embodiments of the present invention are able to handle a much more complex and dirty sample than the CVAF technologies, thus requiring less gas conditioning.

The mercury EMS configured in accordance with certain embodiments disclosed herein may utilize a mercury sensor of a thin film of metal (e.g., approximately 10 $\mu g/cm^2$ or less) coated onto a substrate for collecting mercury from a monitored gas. The thin film metal coating is able to collect mercury through the previously described process of amalgamation. The amalgamation process is sensitive enough to capture ambient air levels of mercury in addition to higher levels of mercury as found in emissions from coal-fired EGUs. The metals used for the thin film coating may be silver and/or palladium, but can be any choice of metals, such as alkali metals, alkaline earth metals, transition metals, post-transition metals, lanthanides, actinides, and/or elements that could be considered to be metals. The thin film metal coating (e.g., 1-10 nm thick) may be deposited in the form of nanoparticles or nanodots using any well-known technique, such as disclosed in U.S. published patent application no. 2010/0050868, which is hereby incorporated by reference herein.

A thin film plastic may be chosen as the substrate for the thin film metal deposition. For example, a polyimide (e.g., Kapton) film may be used to deposit the metal on. However, any thin material can be used, such as a plastic, metal, non-metal, and/or a composite. The thinness of the substrate allows the primary beam to pass through the mercury sensor. As the primary x-ray beam passes through the sensor, the fluorescence generation is optimized for detection, and the x-ray beam that would normally cause background counts, does not cause background counts. An effect of the thinness of the mercury sensor is to increase the signal-to-background ratio of elemental detection by lowering the limit of detection.

The mercury sensor utilized within embodiments of the present disclosure may include a substrate of polyimide tape coated with a thin film metal to collect mercury. In an exemplary embodiment of the present invention, the polyimide tape may be 1 mm or less, 25 microns or less, or even 7.5 microns or less in thickness. Polyimide may be chosen as a substrate for two reasons. First, the polyimide structure contains chains of nitrogen and hydrogen. These elements are not detectable by XRF under ambient conditions, and therefore produce no peaks on the XRF spectrum. The physical process that accounts for their lack of detection is their low Z number. Second, polyimide is a high temperature material able to withstand temperatures up to 750° F., making it a suitable substrate to withstand the elevated temperatures of flue gas.

XRF technology is both a quantitative and qualitative measurement. Quantitative measurements are conventionally measured with internal standards. For example, in the TXRF mode of operation, an internal standard is a known element at a specified concentration that is added to the sample region. When the internal standard is added to the sample region, the instrument can be used for real-time calibration in order to ensure accurate results of the unknown materials that are in the sample to be analyzed. In embodiments of the present invention, the metal thin film may function as both the collection material and the internal standard for calibration.

The strength of a mercury monitor can be measured with a value called the lower limit of detection ("LLD"). In analytical chemistry, the detection limit, lower limit of detection, or LOD (limit of detection), is the lowest quantity of a substance that can be distinguished from the absence of that substance La blank value) within a stated confidence limit (generally 1%). This value is important because a real-time analysis of mercury vapor for coal-fired EGUs necessitates the measurements of very small amounts of mercury per cubic meter of emission. The lower the limit of detection for mercury, the more powerful the technology is when compared to other mercury monitor technologies. A Thermo Scientific Mercury Freedom System manufactured by Thermo Fisher Scientific Inc. has a LLD in the field of 100 nanograms per cubic meter (100 ng/m$^3$). Embodiments of the present invention meet or exceed the LLD of the Thermo Scientific Mercury Freedom System. Furthermore, embodiments of the present invention provide a mercury EMS that meets or exceeds performance specifications outlined in U.S. EPA PS-12A and/or Part 75 provisions for mercury monitor systems in addition to the latest MATS and MACT rules.

As will be further disclosed herein, certain embodiments of the present invention utilize a continuously spooled tape (e.g., polyimide) on which a thin metallic film has been deposited. This metal-coated tape is then utilized to monitor mercury emissions through the process of amalgamation of the detected mercury with the thin metallic film. Within embodiments of the present invention, the thin film of metal may have a thickness within the nanometer dimensions producing a mercury nano-sensor tape for collecting vapor phase mercury, such as from the flue stacks in a coal-fired plant (e.g., see FIG. 3). As previously noted, many metals can form amalgams with mercury, and therefore could be utilized for the thin metallic film within embodiments of the present invention. For the purposes of describing embodiments of the present invention hereinafter, examples will be presented in which a thin film of silver (Ag) has been applied to a continuous tape, acting as the substrate for the thin metallic film. Within embodiments of the present invention, such a continuous tape may be a polyimide (e.g., Kapton) film or tape.

Figure 3:
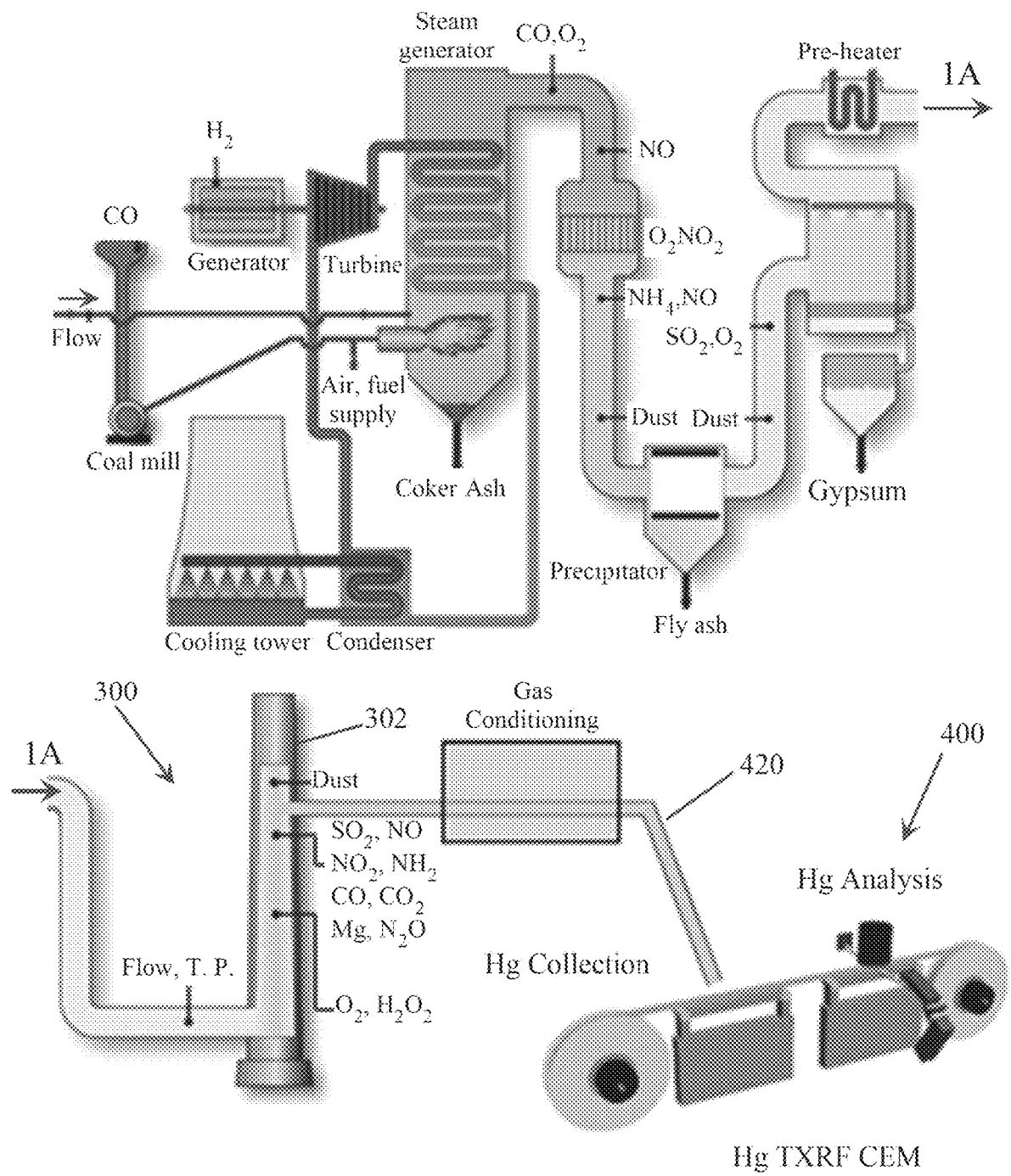
FIG. 3 illustrates a system for monitoring mercury emissions configured in accordance with embodiments of the present invention.
Figure 4:
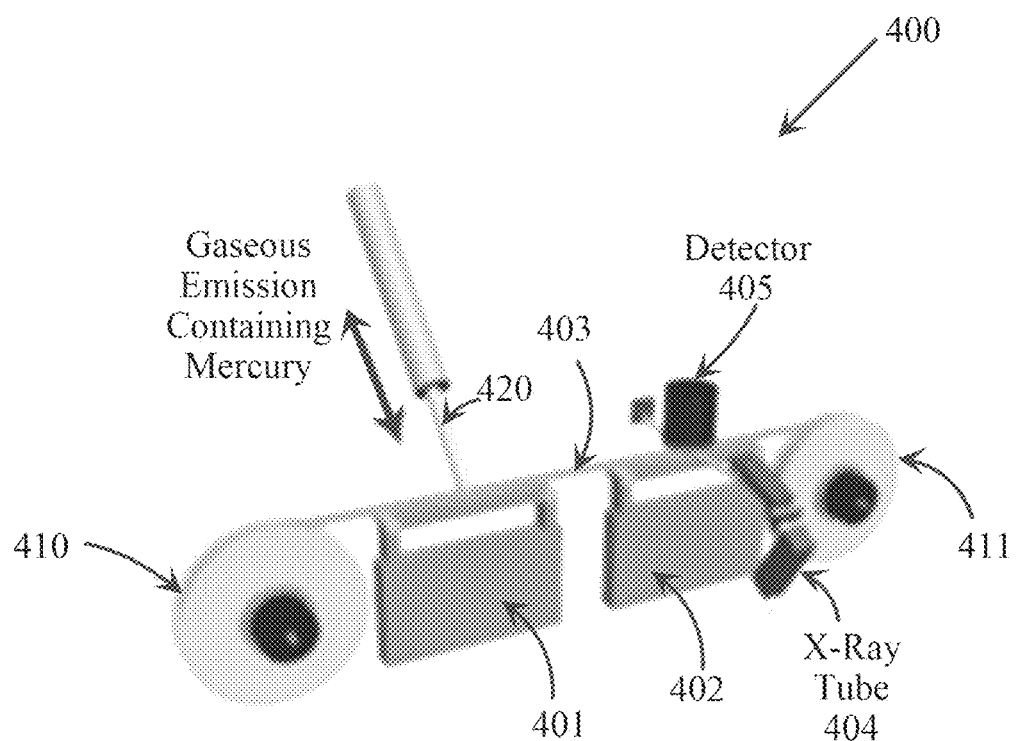
FIG. 4 schematically illustrates a mercury emissions monitoring system configured in accordance with embodiments of the present invention.
Figure 6:
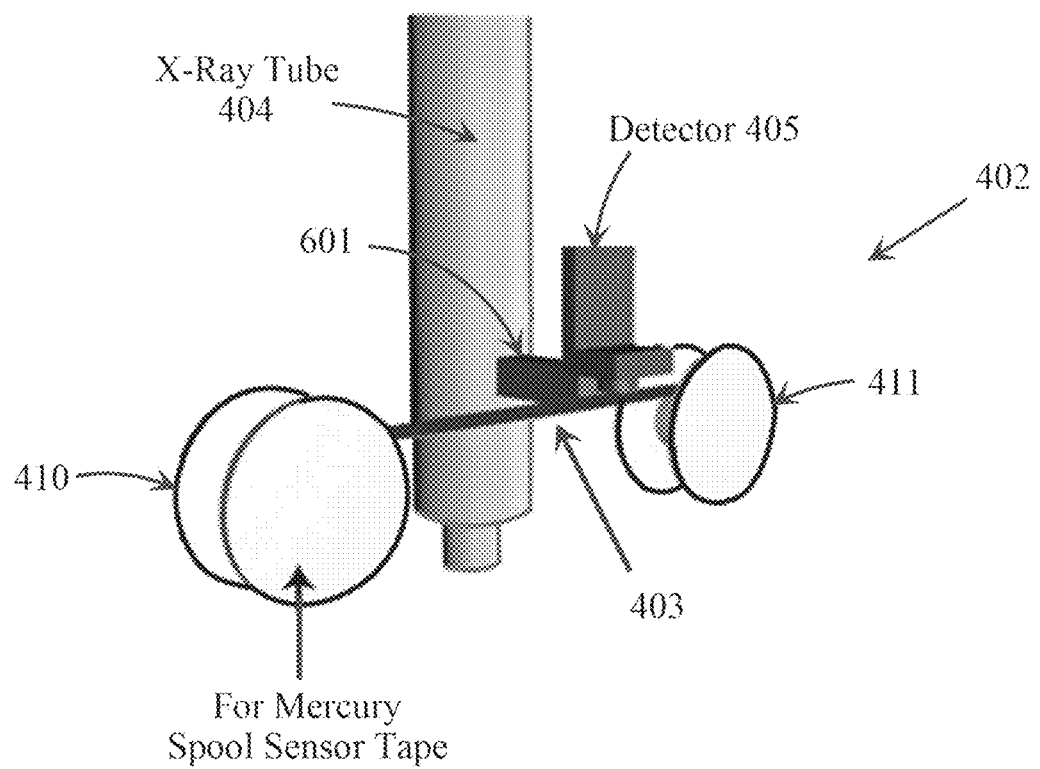
FIG. 6 schematically illustrates a mercury emissions monitoring system configured in accordance with embodiments of the present invention.

FIGS. 3, 4, and 6, discussed hereinafter, depict such a continuous mercury sensor tape, which spools from one tape reel to another in a reel-to-reel manner. Deposition of the metallic thin film onto a polyimide tape may be performed using any well-known deposition process, such as a vacuum deposition process whereby a reel-to-reel tape drive can be configured to fit inside such a vacuum deposition chamber. A spool of polyimide tape is then unrolled by the tape drive within the vacuum chamber where it is exposed to the source of the metal to be deposited onto the polyimide tape. After deposition, the tape then continues where it is rolled up onto a new spool reel within the vacuum chamber. The final product is a spooled polyimide tape coated with a thin film of metal. Within embodiments of the present invention, such a vacuum deposition process can be configured to deposit a thin film of silver of a density of 10 µg/cm$^2$ onto a spooled polyimide tape.

The previously noted mercury measurement of 100 ng/m$^3$ is mass per volume, but embodiments of the present invention utilize a tape-based collection technique that measures collected mercury by mass per surface area. A principle behind the tape-based technique is that the mercury collected from a volume of gas is concentrated onto the surface area of the tape. In this fashion, the measurement of mass per volume can be converted into mass per surface area.

The calculation is as follows: greater than 90% of the mercury is collected by the sensor. Ten minutes of collection time will concentrate ten liters of gas into one square centimeter.

$$\frac{\text{(assumed limit of detection)}}{\text{(concentration of gas on thin film)}}$$

$$\frac{1\frac{\text{ng}}{\text{cm2}}}{0.01\frac{\text{m3}}{\text{cm2}}} = 100 \text{ ng/m3}$$

(Lower Limit of Detection)

If the tape-based technique produces a limit of detection of 1 ng/cm$^2$, then it will be able to detect 100 ng/m$^3$. Therefore, the tape-based technique of embodiments of the present invention can outperform Thermo Scientific Mercury Freedom System if it can achieve a LLD of less than or equal to 1 ng/cm$^2$.

A controlled experiment was performed by the inventors to validate the performance of mercury sensors configured according to embodiments of the present invention. In these experiments, a one millimeter thick Kapton film was coated with a thin film of silver. Four samples were created for the analysis. Sample 1, the control, was a Kapton film with no coating of silver. Sample 2 was a Kapton film coated with a 10 µg/cm$^2$ film of silver. Sample 3 was a Kapton film coated with a 10 µg/cm$^2$ film of silver and exposed to vapor phase mercury to collect 1 µg/cm$^2$ of mercury. Sample 4 was a Kapton film coated with a 10 µg/cm$^2$ film of silver and exposed to vapor phase mercury to collect 5 µg/cm$^2$ of mercury. The four samples were then analyzed with x-ray fluorescence to validate the performance of the mercury sensor's ability to collect vapor phase mercury. The XRF analysis validated the successful deposition of the 10 μg/cm² film of silver on the Kapton films as well as the collection of the 1 μg/cm² and 5 μg/cm² of mercury.

Follow on experiments were performed in which a 7.5 micron thick Kapton film was coated with various thicknesses of a thin film of silver, which were then exposed to vapor phase mercury. Various LLD values were produced including an LLD value of 0.270 ng/cm² collected by a coating of 1 μg/cm² of silver. Such a thin film coating of 1 μg/cm² of Ag produced a LLD value of 0.270 ng/cm², which translates to 27 ng/m³. This LLD value of 27 ng/m³ is less than the foregoing 100 ng/m³.

Figure 2:
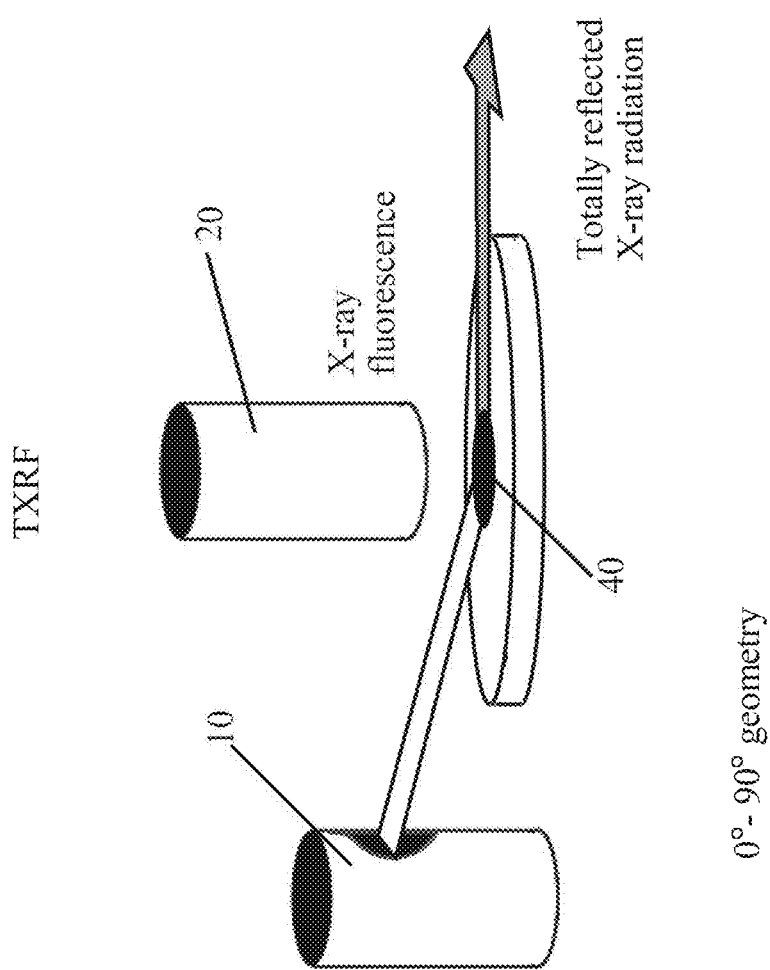
FIG. 2 illustrates a schematic of a total reflection x-ray fluorescence ("TXRF") system configured in accordance with embodiments of the present invention.

Referring to FIGS. 1 and 2, a difference between a TXRF system and an ED-XRF system is the applied geometry and angle of incidence of the incoming primary x-ray beam used for fluorescence of the sample. Referring to FIG. 1, an exemplary ED-XRF system has approximately a 45 degree angle of incidence of the primary x-ray beam from the x-ray tube 1 with respect to the sample 3. The x-ray detector 2 is then placed at a 45 degree angle with respect to the sample 3, and the full range of x-ray fluorescent ("XRF") energies are measured from the sample 3, as well as those XRF energies emitted by the device holder, and even a small contribution from the x-ray tube 1.

Referring to FIG. 2, a TXRF system configured in accordance with embodiments of the present invention has approximately less than a one degree angle of incidence of the primary x-ray beam 2 from the x-ray tube 10 with respect to the sample 40, and the x-ray detector 20 is placed substantially parallel to the sample. This low angle of incidence allows the detector to be placed very close to the sample. For example, the advanced XRF technology disclosed herein can place the detector 3 mm or less from the sample. Conversely, conventional ED-XRF technology (see FIG. 1) places the detector 2 half an inch to one inch away from the sample 3. Placing the detector 20 closer to the sample 40 increases the solid angle from the sample 40 and also increases the fluorescent yield for the resultant measurement.

The different angles of incidence between the ED-XRF and TXRF systems have a substantial impact on the magnitude of the x-ray fluorescent signal detected. In a TXRF system, the sample holder that the sample 40 is placed on may have a very high degree of x-ray reflectivity, such as silicon or quartz. When the primary x-ray beam irradiates the sample holder, a combination of interference in addition to standing waves with the primary x-ray beam produces highly localized and elevated degrees of x-rays that are delivered to the sample. Primary x-rays that are reflected from the sample holder that do not interact with the sample 40 are passed along their reflected path and are guided away from the detector 20. The reflected x-rays that do interact with the sample 40 will cause the sample 40 to undergo x-ray fluorescence. The newly generated fluorescent x-rays will propagate to fill a volume that matches the angular distribution from a point source that is very closely approximated to an intermediate between a lambertian distribution and an isotropic distribution. The fluorescent x-ray angular distribution will have a peak intensity directly above the sample 40 where the detector 20 is located. The separation of the reflected primary x-ray beam from the fluorescent x-rays cause a dramatic increase in the signal-to-noise ratio.

Current XRF air monitoring technology operates with ED-XRF modes and geometrical arrangements of hardware as seen in FIG. 1. This ED-XRF technology typically has a lower limit of detection ("LLD") in single digit parts per million ("ppm") with an analysis time of 30 minutes or greater. The mercury EMS disclosed herein utilizes a novel geometrical arrangement of XRF hardware that allows the same measurement to be taken in less time (e.g., from minutes to as few as seconds). The new geometrical arrangement also reduces the limit of detection from ppm to parts per billion ("ppb"), and as low as parts per trillion ("ppt").

Additionally, the XRF technology of the mercury EMS disclosed herein can measure the sample in real time. Utilizing a continuous polyimide tape, the sample is collected and analyzed in a continuous fashion as opposed to conventional systems where the sample is stationary and not moving. The XRF detector is than able to measure the concentration of the sample in real time and not in a discontinuous fashion.

Referring to FIG. 3, coal-fired EGUs 300 combust coal to generate heat, which is used to convert water into steam. The steam is used to spin a turbine and generate electricity, which can be supplied to the national electricity grid. The combustion occurs at high temperature, and gaseous molecules are released into the emissions stack 302. All types of coal contain minute amounts of mercury (typically, on the order of 0.5 ppm), which is released into the stack 302 as a byproduct from the combustion of the coal. Embodiments of the present invention collect the mercury vapor from the source through a sample line 420, and the gas is transported into an exposure chamber (see FIG. 5) inside a mercury CEM 400 (see FIG. 4).

The mercury CEM 400 may be self-contained and can be operated independently of a mercury generator or additional instrumentation. For example, it may be placed in a control room next to an emissions stack 302 where a sample line 420 can be drawn down to the mercury CEM 400 where the samples can be analyzed for mercury concentrations.

Referring to FIG. 4, there is illustrated a schematic diagram of the mercury CEM 400 configured in accordance with embodiments of the present invention. As previously noted, a sample of a gaseous emission containing mercury may be provided by the sample line 420 into a mercury (Hg) collection unit 401. A continuous mercury sensor tape 403 is spooled from the tape reel 410 to pass through an exposure chamber of the mercury collection unit 401, an example of which is further described with respect to FIG. 5. After a portion of the tape 403 has collected a sample of mercury, it is then fed through the mercury analysis unit 402, which will include a TXRF system that includes an x-ray tube 404 and detector 405. The mercury collected on the tape 403 is then analyzed with the detector 405 after being irradiated by the x-ray tube 404 under a TXRF configuration. The mercury sensor tape 403 is then collected onto the tape reel 411. Thus, as can be readily seen, the reel-to-reel movement of the mercury sensor tape 403 through the mercury collection unit 401 and the mercury analysis unit 402 allows embodiments of the present invention to function in a continuous mode for mercury measurements.

In alternative embodiments of the present invention, only the mercury collection unit 401 and the continuous tape 403 spooled between the tape reels 410, 411 may be co-located onsite where the gaseous sample is taken. After the entire roll of tape has been run through the mercury collection unit 401, it then can be ejected from the tape drive and delivered to another location for analysis by a TXRF mercury analysis unit 402.

Figure 5:
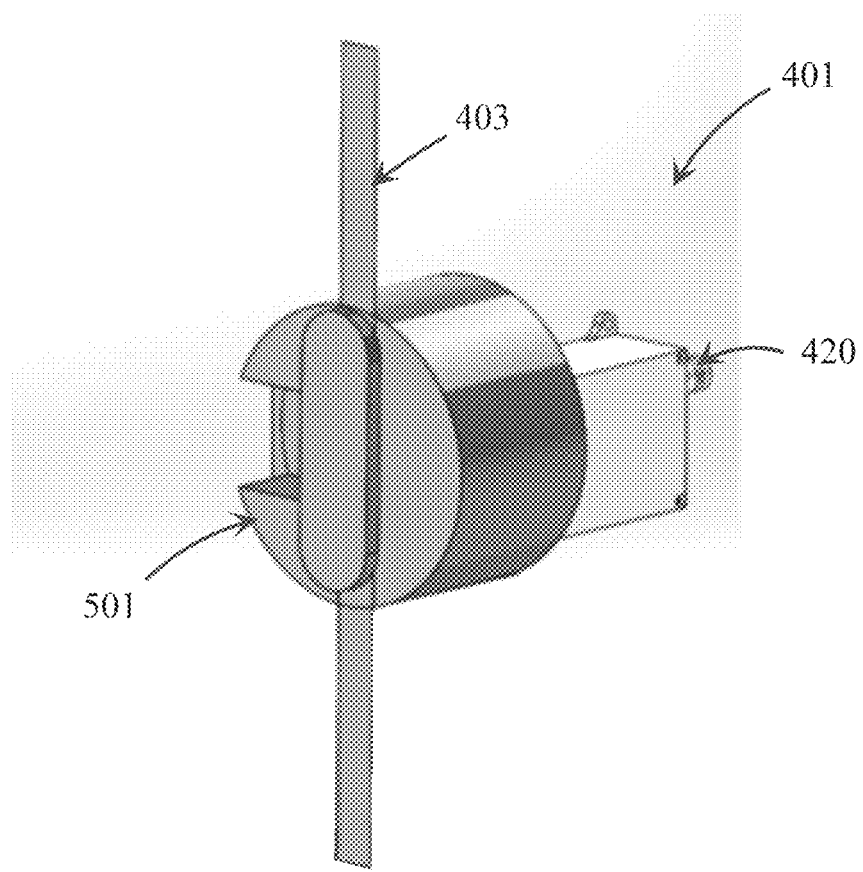
FIG. 5 illustrates an exposure chamber of a mercury emissions monitoring system configured in accordance with the embodiments of the present invention.

Referring to FIG. 5, there is illustrated an example of a mercury collection unit 401, which may be utilized within the mercury CEM 400. A sample of a gas which contains mercury vapor is collected from a source (see FIG. 3) and fed into the sample line 420 where the gas is transported into the exposure chamber 501 through which the mercury sensor tape 403 passes. The exposure chamber 501 forms a sealed environment to which the gas can enter and be collected onto the tape as an amalgam for further analysis by the mercury analysis unit 402. The exposure chamber 501 is sufficiently sealed (e.g., leak tight) to prevent the gas from contaminating the rest of the system 400, while still allowing a continuous operation of the sample collection by the passing of the mercury sensor tape 403 through the chamber 501. The chamber 501 may be configured to be leak-tight by the utilization of double rollers (not shown) at the entrance and exit of the chamber 501 where the mercury sensor tape 403 passes. The configuration of such a leak-tight exposure chamber is well within the capabilities of one of ordinary skill in the art.

Referring next to FIG. 6, there is illustrated a schematic diagram depicting how a TXRF system is utilized within the mercury analysis unit 402. The tape reel 410 containing the mercury sensor tape 403 feeds the mercury sensor tape 403 past the TXRF system. For example, a stepper drive motor (not shown) may be utilized to turn the tape reel 411 to draw the tape 403 from the tape reel 410 so that is passes by the detector 405. As can be seen in FIG. 6, the x-ray tube 404 and detector 405 are configured as a TXRF system whereby the primary x-ray beam from the x-ray tube 404 irradiates the mercury amalgam on the tape 403 as it passes by so that XRF is detected by the detector 405. X-ray optics 601 may be utilized to assist in directing the primary x-ray beam from the x-ray tube 404 for incident irradiation of the samples on the tape 403 in a configuration so that the detector 405 is positioned very close (e.g., about 3 mm) to the tape 403.

Figure 7:
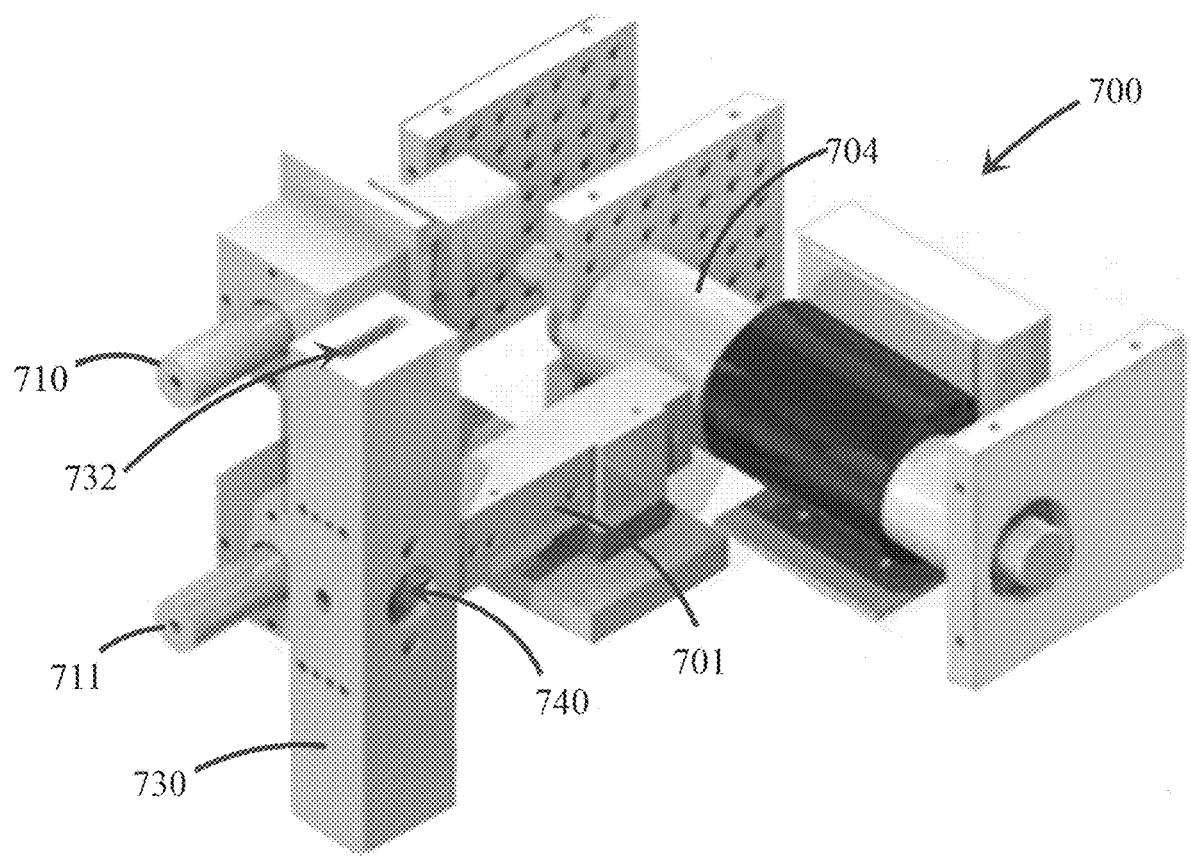
FIG. 7 illustrates a cut-away view of a mercury emissions monitoring system configured in accordance with embodiments of the present invention.

Referring next to FIG. 7, there is illustrated a cut-away view of embodiments of the present invention configured for performing an XRF analysis of mercury samples collected on a continuous running tape (e.g., the mercury sensor tape 403). The apparatus 700 illustrated in FIG. 7 may be utilized within the mercury CEM 400. This cut away view strips away the cover of the x-ray tube container or case so that the x-ray tube 704 is revealed. The x-rays are generated in a very small beam that exits from an aperture (not shown) on the x-ray tube 704, where the x-ray beam is then allowed to enter the x-ray optics chamber 701.

The internal configuration of the x-ray optics chamber 701 is not shown, since such x-ray optics are well within the capabilities of a person of ordinary skill in the art. Nevertheless, note that the natural x-ray beam from the x-ray tube 704 enters into the optics chamber 701 in its natural isotropic polychromatic state, where it then interacts with the x-ray optics and exits as a monochromatic beam. The x-ray optics chamber 701 performs beam conditioning which may include filters, mirrors, multi-layer mirrors, collimators, monochromators, polycapillary optics, diffractive optics, refractive optics, Fresnel zone plates, kumakhov lenses, secondary targets, scatterers, and/or polarizers. In embodiments of the present invention, such beam conditioning generates a square shaped x-ray beam. This beam shape may be desirable because it spreads out to form a large spot size when it strikes the sample at the low angle of incidence. Such a large spot size can facilitate the ease of measurement and generation of fluorescence.

Such a monochromatic beam may have a dimension of 100 microns in height by 7 mm wide. This monochromatic x-ray beam exits the x-ray optics chamber 701 and enters into the exposure chamber 730 through which the mercury sensor tape (not shown) enters into the slot 732 of the exposure chamber 730, through the center of the chamber 730, to then exit at the bottom through a similar slot (not shown). The x-ray beam enters the exposure chamber 730 to interact with the mercury sensor tape passing through the chamber 730. This interaction produces fluorescent photons, which are measured by the detector (e.g., the detector 405), which is inserted into the orifice 740 of the chamber 730. Within embodiments of the present invention, the detector window may be placed less than 3 mm away from the tape as it passes by. The tape reels 410, 411 for the tape may be inserted onto the shafts 710, 711. One of ordinary skill in the art can readily appreciate that a tape drive motor may be coupled to one or both of these shafts 710, 711 in order to feed the mercury sensor tape from one of the tape reels to the other while passing through the exposure chamber 730.

Thus, it can be readily seen from the configuration 700 how the exposure chamber 730, the x-ray optics chamber 701, and the x-ray tube 704 can be configured in a TXRF configuration, such as previously described with respect to FIGS. 2 and 6.

Figure 8:
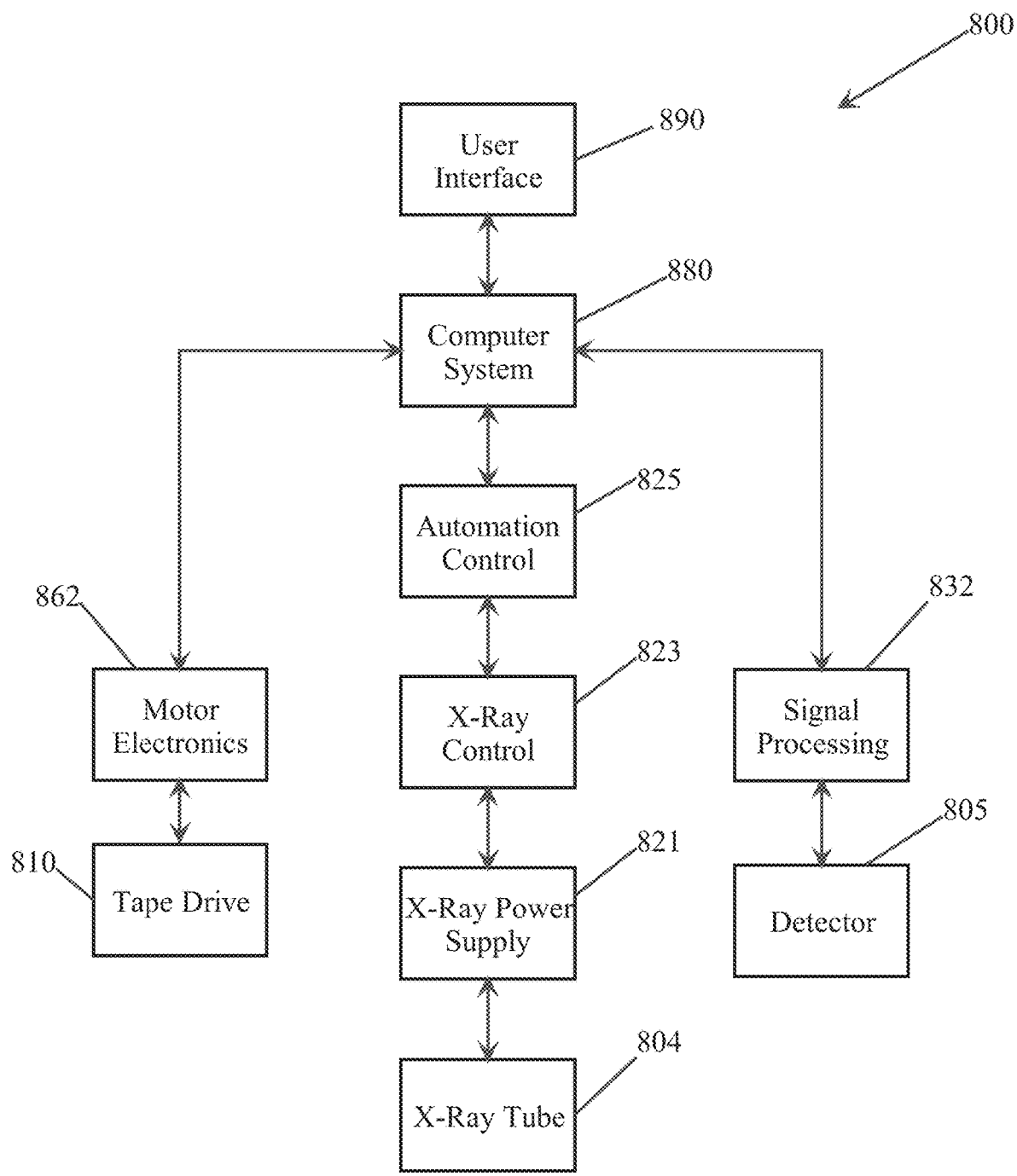
FIG. 8 illustrates a block diagram of a mercury emissions monitoring system configured in accordance with embodiments of the present invention.

Referring next to FIG. 8, there is illustrated a mercury CEM system 800 configured in accordance with embodiments of the present invention. The system 800 may be utilized as a TXRF CEM for detecting, measuring, and/or analyzing mercury emissions as has been described herein. The mercury CEM system 800 may include several subsystems such as an x-ray tube 804, energy analyzing detector 805, x-ray optics, an optional flue gas treatment, software, hardware-electronics, data collection, power supply and distribution, enclosures, and safety features, not all of which are described for the sake of simplicity. FIG. 8 provides a configuration for how a mercury CEM system 800 configured in accordance with embodiments of the present invention can be implemented within a single integrated system under the control of computer hardware/software.

The x-ray tube 804 and x-ray detector 805 may be implemented within a TXRF system as previously described herein with respect to FIGS. 2, 4, 6, and 7. Within embodiments of the present invention, the x-ray tube 804 may be a commercially available rtw MCB 50-0.7 x-ray tube. The detector may be a commercially available SiPN or SDD detector. The detector 805 may include one or more XPIN-XT detectors, commercially available from Moxtek. The signal processing module 832 may be an MXDPP-50 digital pulse processor, amplifier, power supply, and communication port for the detector, which is commercially available from Moxtek.

The x-ray power supply 821 may be a commercially available Spellman high voltage generator and power supply, which may be configured to produce x-rays with an energy level of 50 keV.

In order to pass the mercury sensor tape from one tape reel to another past the mercury collection unit 401 and the mercury analysis unit 402, stepper motors may be utilized for the tape drive 810, wherein the stepper motors are controlled by motor electronics 862. A 24 volt DC power supply may be used in the motor electronics 862 to drive the stepper motors used for the tape reels. The motor electronics 862 may be configured with a stepper motor driver board used to generate a modulated pulse width for microstepping and control of the rotation of the motor shafts (e.g., shafts 710, 711). The stepper motor driver boards may use a separate 5 volt opto-electric coupler to ensure signal fidelity of the stepping motion. The stepper motor driver boards may be controlled from step and direction pins from the parallel port of the computer system 880. The tape reels 410, 411 may be made from acrylic discs and an acrylic tube that are glued together, and may feature a key used to lock and track the movement of the mercury sensor tape during operation through the use of the stepper motor.

Labview, commercially available from National Instruments, may be loaded onto the computer system 880 to control the mercury CEM 800. With the Labview software, a user interface 890 can be designed to control all aspects of the system 800, including power control, spooling, and spectrum measurement from the MXDPP-50. Furthermore, a National Instruments ("NI") 6008 USB driver boards may be used to control both digital and analog inputs and outputs. Labview includes pre-written sets of instructions known as virtual instruments ("vi"), which are supplied with the software. Use of vi's for each subsystem disclosed in FIG. 8 can minimize the software coding time by having preset commands pre-written in the communication protocols. Thus, each of the subsystems used in the system 800 can have a vi associated with it. For example, the detector 805 can have a vi to download and display the spectrum information from the signal processing electronics 832. The NI USB 6008s can have vi's for reading analog voltages from the control 823 used in this application to measure the status of the x-ray tube in real time. Labview can be configured to have a vi for controlling the stepper motors 862. The vi controls the number of steps and direction that gets sent through the parallel cable to the stepper motor driver boards 862. All of these vi's can be used in an object-oriented coding space to write the software to control the system 800. A user interface 890 can be generated based on the code, which is able to run processes in order to control the x-ray tube, move the tape, and then gather the XRF spectrum.

Figure 9:
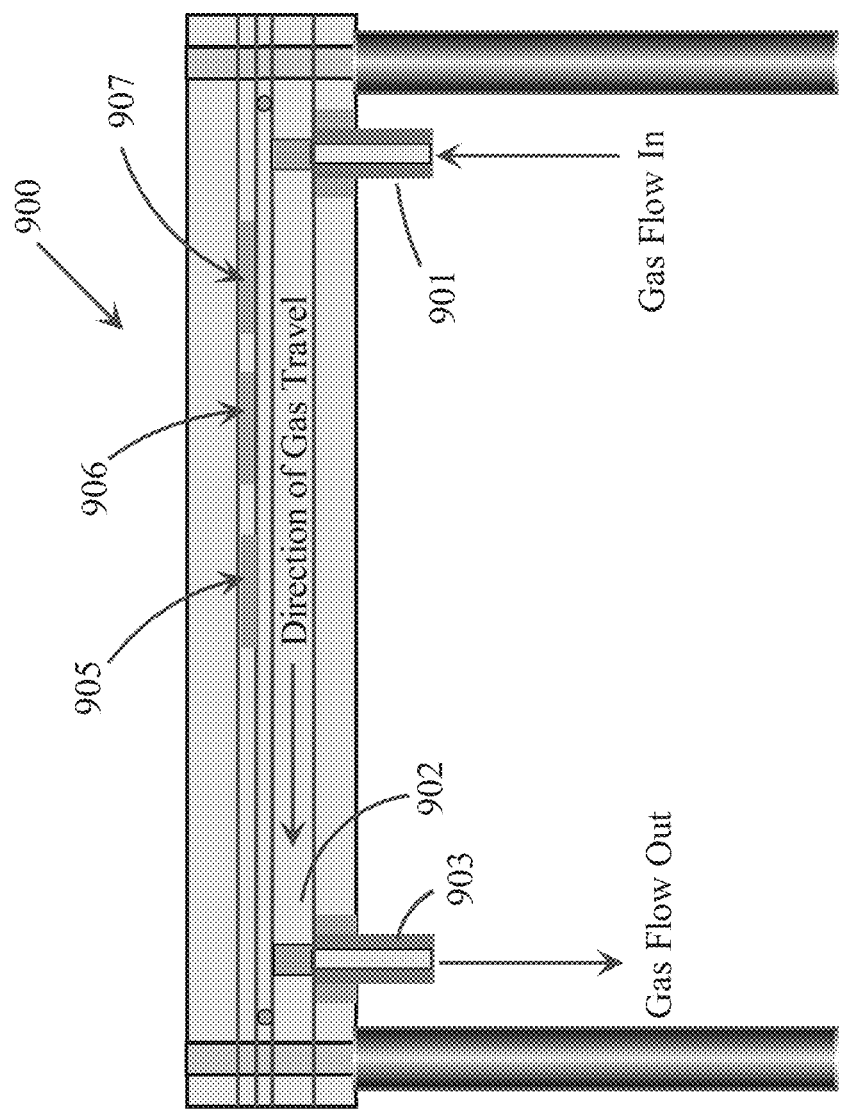
FIG. 9 illustrates an exposure chamber configured in accordance with embodiments of the present invention.
Figure 10:
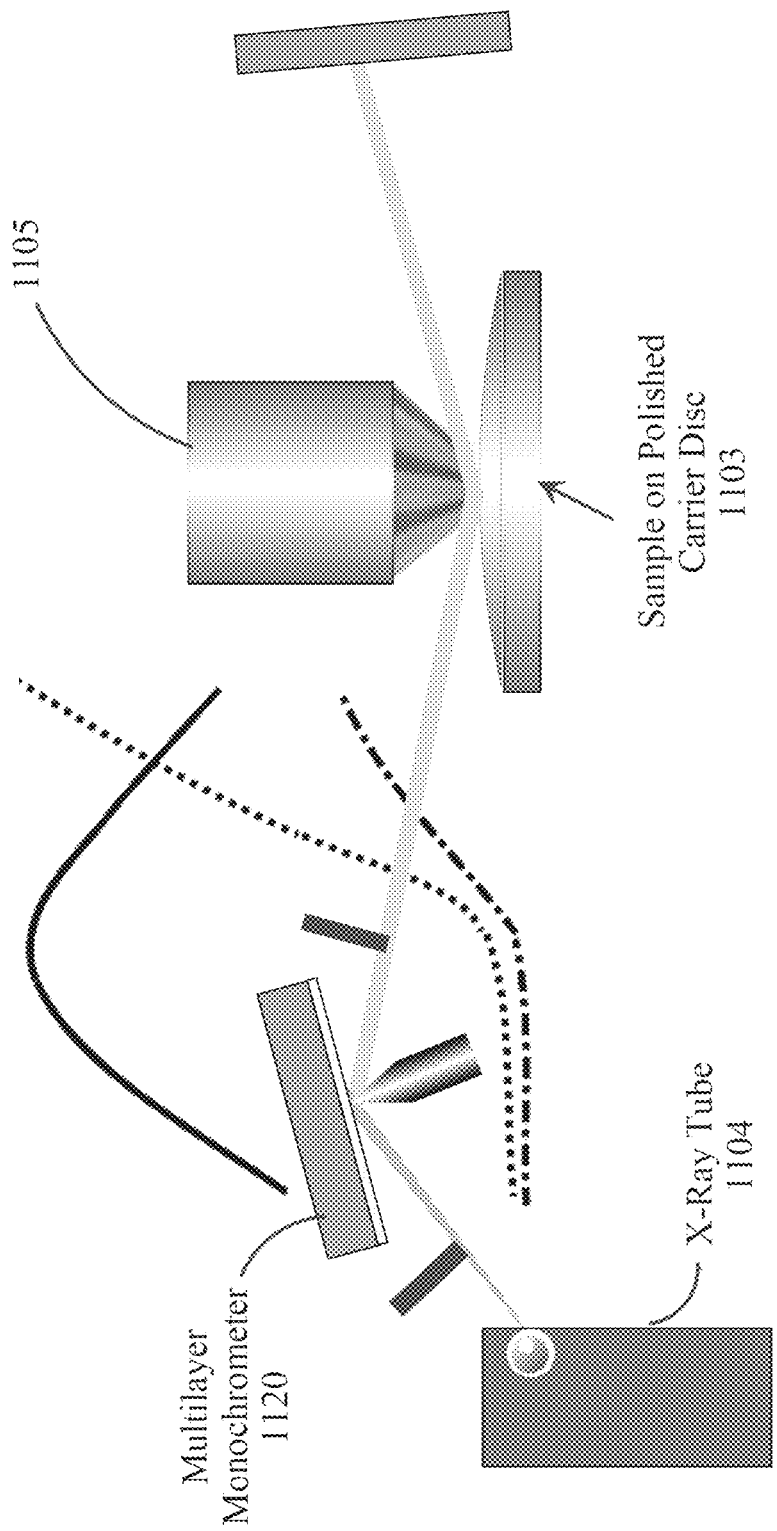
FIG. 10 illustrates a mercury analysis unit configured in accordance with embodiments of the present invention.

Referring to FIGS. 9-10, alternatively, a substrate such as a disc could also be used for remote collection of mercury. In this fashion, mercury collection could occur at a site of interest and the mercury could be measured in an instrument that can measure the mercury captured. For example, a polyimide disc with a thin film of metal deposited thereon could be utilized as the mercury sensor in a similar manner as previously described with respect to the mercury sensor tape 403.

Referring to FIG. 9, some sort of exposure chamber 900 could be utilized whereby one or more such discs 905-907 are positioned within the chamber 900 which has a passageway 902 for passage of a gas containing mercury. For example, a sample of a gaseous emission may be supplied into the inlet 901 to thereby be allowed to travel in the passageway 902 and exit from the outlet 903. While the gas is in the passageway 902, mercury is collected on the one or more discs 905-907.

The chamber 900 may include three layers of plastic clamped by two pieces of aluminum. It may be configured to stand upright on four legs and have two compression fittings: one for the inlet 901 and one for the outlet 903. There may be an O-ring that sits in the middle layer of the plastic chamber, and the two aluminum pieces give the strength needed to seal the O-ring to create the sealed passageway 902 for the gas to flow through. The chamber 900 can be opened to thereby mount the mercury sensor disks 905-907.

The coated sides of the disc(s) face downwards in the passageway 902, so that they can be exposed to the flow of gas. After exposure, the discs 905-907 are removed in the same fashion.

Referring to FIG. 10, a mercury sensor disc can then be transported to a mercury analysis unit such as the one illustrated in FIG. 10 whereby a TXRF system that includes an x-ray tube 1104, a monochromator 1120, and a detector 1105 are positioned in such a TXRF configuration (such as previously described with respect to FIG. 2) in order to irradiate the mercury samples collected on the disc 1103 for analysis.

Figure 11:
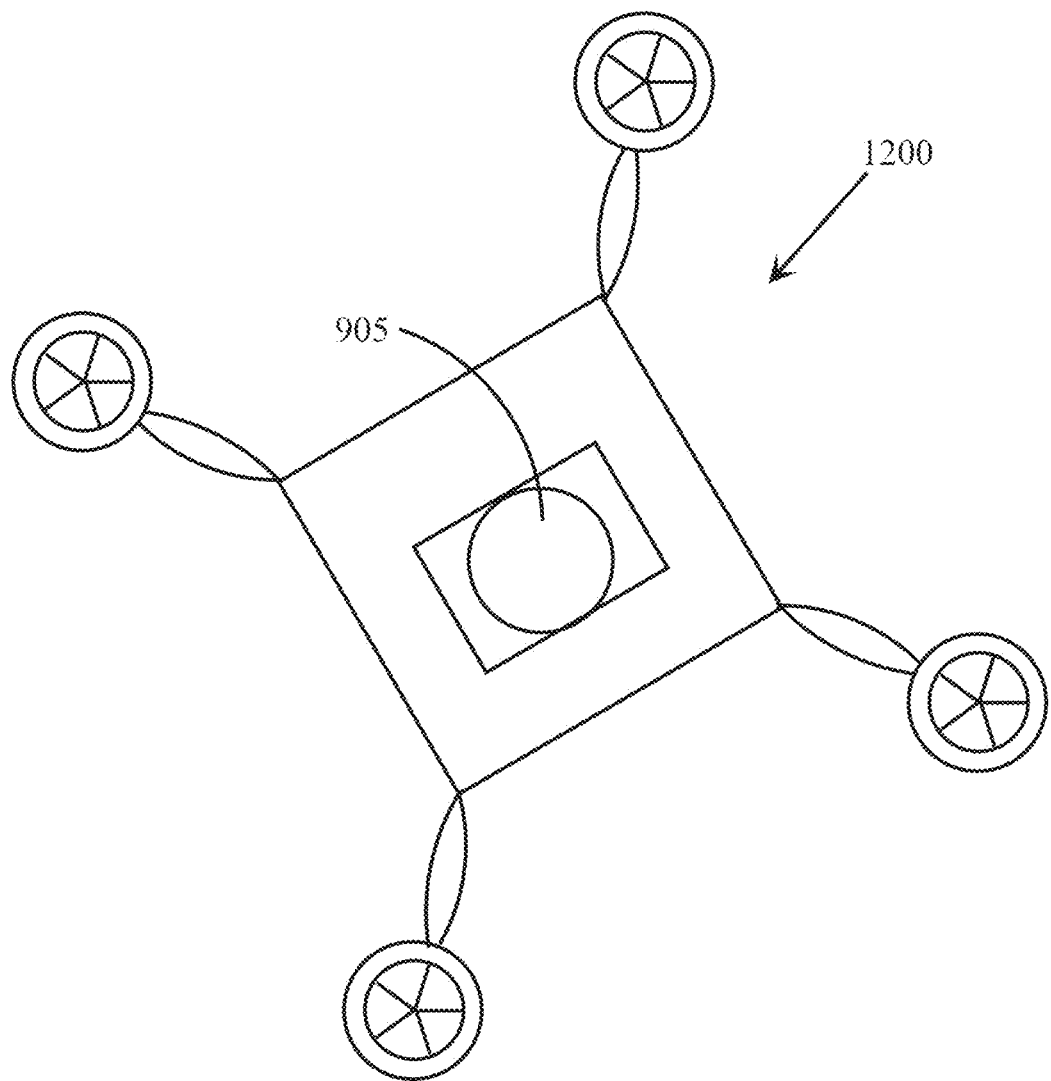
FIG. 11 illustrates an alternative embodiment of the present invention.

Referring to FIG. 11, in accordance with certain embodiments, an unmanned aerial vehicle ("UAV") 1200 may be configured to hold either a mercury sensor disc 905 or tape drive in order to collect mercury samples as the UAV flew within the vicinity where mercury vapor is suspected (e.g., a flue stack 302). The sensor disc or sensor tape could then be removed from the UAV 1200 and placed into an XRF instrument (e.g., see FIG. 10) to measure the mercury that was collected during the flight of the UAV 1200. For the tape sensor, the position of the UAV 1200 can be correlated to the section of tape, and in this fashion, mercury concentrations can be collected for volumetric regions of atmosphere. A tape drive or simple filter could also be used on a UAV 1200 to collect elements other than mercury, which can then be used to measure atmospheric elemental concentrations.

Though a typical flue stack (e.g., see FIG. 3) contains several gasses such as $SO_2$, NO, $CO_2$, $O_2$, and $N_2$, in addition to the mercury vapor, embodiments of the present invention were able to detect and measure the mercury in such emission gasses, without the presence of these gasses affecting the collection efficiency of the sensor.

As opposed to coal-fired EUG testing or atmospheric testing, the mercury sensors are sensitive enough to detect levels of mercury under ambient air conditions. Therefore, these single sensors or the tape sensor may be placed in the environment in order to measure the amount of mercury in ambient air. The sensors may then be placed into an XRF instrument to measure the amount of mercury that was present in the ambient air at that location. Also, these sensors can be used not only by XRF instrumentation, but also, CVAF, CVAA, and ICPMS.

Though exemplary embodiments of the present invention were described with respect to utilization in a coal-fired EGU, embodiments of the present invention are not limited to such an application, but instead may be utilized in any application where measurements of mercury (or any other element or compound) are desired, such as the oil and gas industry, steel scrap processing facilities, gold production, and waste incineration.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a" and "an" mean "one or more" when used in this application, including the claims.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

As used herein, the term "about" is used to provide flexibility to a numerical range endpoint by providing that a given value may be "a little above" or "a little below" the endpoint.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "significance" or "significant" relates to a statistical analysis of the probability that there is a non-random association between two or more entities. To determine whether or not a relationship is "significant" or has "significance," statistical manipulations of the data can be performed to calculate a probability, expressed as a "p value." Those p values that fall below a user-defined cutoff point are regarded as significant. In some embodiments, a p value less than or equal to 0.05, in some embodiments less than 0.01, in some embodiments less than 0.005, and in some embodiments less than 0.001, are regarded as significant. Accordingly, a p value greater than or equal to 0.05 is considered not significant.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of approximately 1 to approximately 4.5 should be interpreted to include not only the explicitly recited limits of 1 to approximately 4.5, but also to include individual numerals such as 2, 3, 4, and sub-ranges such as 1 to 3, 2 to 4, etc. The same principle applies to ranges reciting only one numerical value, such as "less than approximately 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus function limitations will only be employed where for a specific claim limitation all of the following conditions are present in that limitation: a) "means for" or "step for" is expressly recited; and b) a corresponding function is expressly recited. The structure, material, or acts that support the means-plus function are expressly recited in the description herein. Accordingly, the scope of the invention should be determined solely by the appended claims and their legal equivalents, rather than by the descriptions and examples given herein.

What is claimed is:

1. A mercury emissions monitor comprising:
   a mercury sensor tape configured to be fed in a reel-to-reel manner between first and second tape reels, wherein the mercury sensor tape comprises a metallic film configured to form an amalgam with detected mercury;
   a mercury collection unit configured to receive into a chamber a sample of a gas containing mercury, wherein the mercury collection unit is further configured to permit passage of portions of the mercury sensor tape through the chamber containing the gas sample so that the amalgam is formed with the metallic film; and
   a mercury analysis unit comprising a total reflection x-ray fluorescence ("TXRF") system configured to perform an x-ray fluorescence ("XRF") analysis of the amalgam, wherein the mercury analysis unit is configured to permit passage of the mercury sensor tape within a proximity of an XRF detector of the TXRF system.

2. The system as recited in claim 1, wherein the mercury collection unit and the mercury analysis unit are positioned between the first and second tape reels so that the mercury sensor tape can move in a continuous manner from the first tape reel through the chamber of the mercury collection unit, then within sufficient proximity to the XRF detector, to be then spooled onto the second tape reel.

3. The system as recited in claim 1, wherein the mercury sensor tape comprises a polyimide substrate having a thickness of 7.5 microns or less.

4. The system as recited in claim 1, wherein the mercury sensor tape is configured so that the TXRF system can detect mercury in the amalgam with a lower limit of detection of about 27 ng/m$^3$ or less.

5. The system as recited in claim 1, further comprising a sample line connected to the chamber, wherein the sample line is configured to receive the gas sample from a source that produced the gas sample with the mercury contained therein, wherein the source is a flue stack of a coal-fired electricity generating unit.

6. The system as recited in claim 1, wherein the metallic film has a coating on the mercury sensor tape of about 10 μg/cm$^2$ or less.

7. The system as recited in claim 6, wherein the metallic film is about 1-10 nm thick.

8. The system as recited in claim 7, wherein the mercury sensor tape comprises a plastic substrate having a thickness of about 1 mm or less, and is configured to withstand temperatures up to 750° F.

9. The mercury emissions monitor as recited in claim 1, wherein the mercury sensor tape comprises a plastic substrate having a thickness of about 1 mm or less, and is configured to withstand temperatures up to 750° F.

10. The mercury emissions monitor as recited in claim 1, wherein the mercury sensor tape has a coating of 1 μg/cm$^2$ of silver that can detect mercury in the amalgam with a lower limit of detection of about 27 ng/m$^3$ or less.

11. The mercury emissions monitor as recited in claim 1, wherein the TXRF system further comprises a monochromator configured to convert a polychromatic x-ray beam from an x-ray source into a monochromatic beam for incidence upon the amalgam.

12. The system as recited in claim 1, wherein the mercury sensor tape is configured so that the TXRF system detects mercury in the amalgam with a lower limit of detection of about 27 ng/m$^3$ or less.

13. A method for detecting mercury in a gas, comprising:
   (a) spooling a continuous mercury sensor tape between first and second tape reels, wherein the mercury sensor tape comprises a metallic film configured to form an amalgam with detected mercury, wherein the mercury sensor tape is spooled in a continuous manner from the first tape reel, through a chamber, then past a TXRF system, before being spooled onto the second tape reel;

(b) receiving into the chamber a sample of gas containing mercury, whereby the mercury in the gas sample forms an amalgam with the metallic film;

(c) passing the mercury sensor tape with the amalgam in proximity to the TXRF system, whereby the TXRF system detects the mercury in the amalgam; and (d) collecting the mercury sensor tape onto the second tape reel.

14. The method as recited in claim 13, wherein the mercury sensor tape is configured so that the TXRF system can detect mercury in the amalgam with a lower limit of detection of about 1 $ng/cm^2$ or less.

15. The method as recited in claim 13, wherein the mercury sensor tape has a coating of 1 $\mu g/cm^2$ of silver that can detect mercury in the amalgam with a lower limit of detection of about 27 $ng/m^3$ or less.

16. The method as recited in claim 13, wherein the mercury sensor tape is configured so that the TXRF system detects mercury in the amalgam with a lower limit of detection of about 1 $ng/cm^2$ or less.

17. A system for detecting mercury in a gas, comprising:
a mercury sensor comprising a metallic film positioned on a substrate, wherein the metallic film is configured to form an amalgam with mercury in the gas;
a chamber configured to receive the gas, wherein the mercury sensor is positioned within the chamber so that the metallic film is exposed to the gas; and
a mercury analysis unit comprising a total reflection x-ray fluorescence ("TXRF") system configured to perform an x-ray fluorescence ("XRF") analysis of the amalgam.

18. The system as recited in claim 17, wherein the mercury sensor is configured so that the TXRF system can detect mercury in the amalgam with a lower limit of detection of about 27 $ng/m^3$ or less.

19. The system as recited in claim 17, wherein the mercury sensor comprises a polyimide substrate having a thickness of 7.5 microns or less, wherein the metallic film has a coating on the mercury sensor of about 10 $\mu g/cm^2$ or less.

20. The system as recited in claim 19, further comprising an unmanned aerial vehicle configured to fly the chamber, with the contained mercury sensor, through the gas.

21. The system as recited in claim 17, wherein the metallic film is formed as a coating of 1 $\mu g/cm^2$ of silver on the substrate that can detect mercury in the amalgam with a lower limit of detection of about 27 $ng/m^3$ or less.

22. The system as recited in claim 17, wherein the mercury sensor is configured so that the TXRF system detects mercury in the amalgam with a lower limit of detection of about 27 $ng/m^3$ or less.

* * * * *